United States Patent
Whitley et al.

[11] Patent Number: 5,956,399
[45] Date of Patent: Sep. 21, 1999

[54] CRADLE FOR MOBILE TELEPHONE OR OTHER ELECTRICAL DEVICE

[75] Inventors: Kevin James Whitley, South Hurstville; Stuart Charles Bowman, Surry Hills; Robert Stephen Matchett, Cremorne, all of Australia

[73] Assignee: Nokia Mobile Phones (UK) Ltd., Hamshire, United Kingdom

[21] Appl. No.: 08/836,616

[22] PCT Filed: Nov. 23, 1995

[86] PCT No.: PCT/AU95/00775

§ 371 Date: Sep. 8, 1997

§ 102(e) Date: Sep. 8, 1997

[87] PCT Pub. No.: WO96/16499

PCT Pub. Date: May 30, 1996

[30] Foreign Application Priority Data

Nov. 23, 1994 [AU] Australia ................................. PM 9622

[51] Int. Cl.[6] ...................................................... H04M 1/00
[52] U.S. Cl. ............................................. 379/446; 379/455
[58] Field of Search .................................. 379/446, 455, 379/454, 426, 449

[56] References Cited

U.S. PATENT DOCUMENTS

| | | | |
|---|---|---|---|
| 4,406,928 | 9/1983 | MacKenzie | 179/146 R |
| 4,957,264 | 9/1990 | Hakanen | 248/510 |
| 5,016,851 | 5/1991 | Koskinen et al. | 248/278 |
| 5,040,712 | 8/1991 | Pesonen et al. | 224/42.45 R |
| 5,121,863 | 6/1992 | Kotitalo et al. | 224/42.45 |
| 5,189,698 | 2/1993 | Hakanen | 379/455 |
| 5,597,102 | 1/1997 | Saarikko et al. | 224/197 |

FOREIGN PATENT DOCUMENTS

| | | |
|---|---|---|
| A 44297/93 | 2/1994 | Australia . |
| 0 545 670 | 6/1993 | European Pat. Off. . |
| 2 286 744 | 8/1998 | United Kingdom . |

*Primary Examiner*—Jack Chiang
*Attorney, Agent, or Firm*—Perman & Green, LLP

[57] ABSTRACT

A receptacle or cradle (11) for receiving a mobile telephone (22) or other electrical or electronic device is disclosed. The receptacle (11) comprises a base unit (12) and a carriage moveable (13) with respect to the base unit (12) for receiving the mobile telephone (22) or other device. The base unit (12) is provided with suitable electrical contact terminals (20) for connection with corresponding electrical contact terminals (21) of the mobile telephone (22). The carriage (13) is restrained from movement in a first receiving position to receive the mobile telephone (22) and the contact terminals (20) of the unit (12) are protected or shielded from damge by virtue of being excluded from making contact with the corresponding contact terminals (21) of the telephone (22) until a predetermined aligment of the telephone (22) relative to the unit (12) is achieved. The carriage (13) has disengagement means associated with it in order to allow travel of the carriage (13) once the predetermined alignment of the telephone (22) is achieved, whereupon the carriage (13) is free to travel to a second in use position in which contact between the contact terminals (21) of the telephone (22) and unit (12) is achieved. The carriage (13) is once again restrained from movement in the second in use position to allow contact to be maintained. The carriage (13) has further disengagement means associated with it in order to release the carriage from its second is use position and thereby to release the mobile telephone (22) from the unit (12) as required.

12 Claims, 8 Drawing Sheets

CRADLE FOR MOBILE TELEPHONE OR OTHER ELECTRICAL DEVICE

This invention relates primarily to so called "hands free units", which are cradles or receptacles for receiving mobile telephones in order that the driver of a vehicle is free to drive without having to hold the mobile telephone whilst it is in use. In particular the invention relates to a carriage mechanism to facilitate alignment of the electrical pins, sockets or other contacts or terminals of the telephone with the corresponding electrical pins, sockets, contacts or other terminals of the hands free unit to avoid damage thereto. The invention also relates to means for restraining the telephone from being dislodged from the unit whilst in use.

Although the invention is especially applicable for use in mobile telephone/hands free vehicle unit combinations, it is equally applicable for use in any receptacle, cradle, cup, adaptor, base or the like designed to receive any electrical or electronic component which requires insertion therein and removal therefrom from time to time particularly where alignment is paramount. For example, the invention finds equal applicability in desk top units designed to emulate the functions of a hands free vehicle unit or equally a desk top unit designed simply for receiving the telephone and/or its batteries for the purpose of recharging. Similarly any receiving device into which an electrical or electronic component is inserted to provide either a hands free operation and/or the ability to recharge the device or its battery (for example portable vacuum cleaners, portable power tools, rechargeable torches and the like including batteries for any of the foregoing), would benefit from the inclusion of slideable carriage according to the current invention as described herein.

Thus, whilst the invention is equally applicable to many combinations where components may be inserted into a receptacle or cradle for hands free or other use and/or recharging, etc., for convenience, the following description refers to its inclusion in a hands free cradle designed to accommodate a mobile telephone in a vehicle, but it is to be understood that the invention is not limited thereto. Any reference to a mobile telephone or its corresponding hands free cradle is meant to encompass any receptacle and its corresponding tool or device (whether rechargeable or not) or its associated battery, where by suitable modifications to the receptacle receiving the relevant device or battery the invention may also be applied.

BACKGROUND OF THE INVENTION

One of the advantages of modern telecommunications involving mobile telephones is of course their portability and convenience. However, the use of mobile telephones in certain conditions, such as driving a vehicle, renders their use unsafe and accordingly hands free units or cradles have been developed for fitment to the fascia or dash of a vehicle or some other convenient position about the driver in order to minimise the need for the driver to hold and therefore physically interact with the mobile telephone whilst engaged in communication on the telephone. This is generally accomplished by providing a receptacle in the form of a cup or cradle into which a mobile telephone is inserted so that the driver of the vehicle may use the telephone essentially "hands free".

As a result of providing appropriate electrical contacts between the telephone and the cradle, several functions normally handled within the mobile telephone itself are able to be transferred to external components in order to facilitate the hands free operation of the telephone by the driver. For example, a microphone is conveniently mounted in a position adjacent to the driver's head in order that he can speak into the microphone without having to have the mouthpiece of the telephone near his mouth while he speaks. Similarly, a connection is provided to an external speaker conveniently mounted for example under the dashboard which provides amplification of the other party's voice so that once again the earpiece of the mobile telephone is not required to be adjacent to the driver's ear. These connections are provided by appropriate electrical contacts between contacts terminals provided in the exterior of telephone, often at the base thereof, and corresponding contact terminals in the receptacle, thereby allowing the respective functions to be transferred from the internal components to such external components as the microphone and speaker described above.

With advantage several other functions may also be transferred from the mobile telephone itself to the wider environment of the vehicle by means of similar connections in order to improve both the performance and general useability of the mobile telephone in the vehicular situation. These include attaching the telephone to the vehicular power supply in order to avoid draining the telephone's own battery and/or alternatively providing power to recharge the battery within the telephone as required. Similarly, the antenna function provided within the mobile telephone can be superseded by connection to an appropriate antenna mounted conveniently on the exterior of the vehicle to improve reception.

In designing hands free units of this nature for receiving mobile phones, two particular problems frequently arise. The first relates to problems associated with positioning the hands free unit itself so that the telephone and hands free unit may be readily located and inserted therein. It is paramount that intimate contact between the various sockets, plugs, pins or the like is achieved so that the telephone may work properly, whilst at the same time it is necessary to avoid possible damage to the contacts. It will be readily appreciated that the technology of mobile telephones provides the advantage of portability and accordingly circuitry and contacts are generally minimised and miniaturised as much as possible to avoid unnecessary volume and weight and accordingly contact terminals are not necessarily all that robust. Thus in bringing the telephone into contact with the hands free unit, it is important that damage between the contacts resulting for example in bent pins or wires is avoided, as contact under those conditions of course will not be achieved. This problem is exacerbated by virtue of the limited number of readily available sites around the vehicle for locating the hands free unit and the corresponding accessibility of those sites for easily locating and inserting the telephone into the unit.

Furthermore, the positioning of the hands free cradle, particularly where such facility is added to a vehicle after construction, requires that the receptacle itself be designed so that it is as compact and streamlined as possible. It is also important that it be multi-functional in so far as it be able to cope with location in a variety of positions over a wide range of vehicle designs. Universal mounting brackets capable of being mounted to various fascia and/or console positions have been developed to overcome some of the design difficulties in fixing such units in such a wide variety of vehicles. Nevertheless, the ultimate location of the hands free unit is often a compromise between accessibility to the driver, avoiding interference with other controls or indeed other vehicle passengers and of course a question of aesthetics. In reaching such a compromise, it is therefore important that the design of the hands free unit itself assist in allowing relatively easy insertion of the telephone therein without unduly limiting or impairing the flexibility for locating the hands free unit.

One conventional means for ensuring that the telephone is properly aligned with the contacts of the unit has been achieved by providing what is effectively an open faced tube into which the telephone is slid. The open face arrangement is provided to maximise access to the front panel of the telephone itself where the major proportion of its controls including the keypad are generally located. However, this design severely limits the number of suitable locations to which the hands free unit may be mounted as sufficient clearance must be provided so that the telephone can be inserted into the tube. Therefore it has been found advantageous to provide a cradle of relatively open design, so that the telephone, rather than being slid along the longitudinal axis of the unit, is instead laid in the cradle from a position adjacent to the front thereof. In other words the telephone can be inserted from above or in front of the unit depending on whether it is upright or laying down, the base of the telephone generally being inserted into a corresponding but relatively short cup portion, the telephone then being rotated into position against the back of the cradle. The obvious disadvantage with this arrangement is that the contact terminals particularly where they are of the pin/socket arrangement, are readily deformed by the twisting motion as the telephone seats against the bottom and back of the cradle. The contact terminals may thus be damaged with consequent loss of use and requirement to repair.

Secondly, once the telephone is in a position where contact is made between the internal circuits and the external circuits referred to above, it is often necessary that the telephone be restrained in that position to avoid loss of contact during operation. This is particularly important in the environment of a moving vehicle where forces of inertia and other shocks and vibrations to the vehicle might result in dislocation of the telephone from its cradle thereby causing not only loss of contact disrupting communication, but danger to the occupants of the vehicle or indeed damage to the telephone or vehicle itself should the telephone become dislodged. In addition, any release mechanism for disengaging the telephone once it is required to be removed, should also be conveniently located on the hands free unit bearing in mind the constraints occasioned by the difficulties in location of the unit itself referred to above.

Consequently, much consideration has been given to designing hands free cradles capable of providing the necessary contact between internal circuitry and external components coupled with appropriate means for retaining the mobile telephone whilst maintaining that contact.

OBJECT OF THE INVENTION

The present invention has therefore been conceived out of the need to provide an appropriate hands free cradle or receptacle to maximise the possibilities available for fitment to a vehicle interior in order to provide easy access to and location of the mobile telephone therein, whilst at the same time providing easy accessibility for removal of the telephone. In addition to providing such ease of accessibility, it is most important that not only is contact between the relevant terminals of the internal and external circuits made, but that such contact is achieved without damage to the contacting pins, sockets, etc. Once that contact is made, it is also preferable that the mobile telephone is retained in that position without fear of disengagement and the consequent problems in loss of communication or danger or damage arising from such dislocation. At the very least the invention provides an alternative to the previously proposed hands free car cradles or receptacles.

DISCLOSURE OF THE INVENTION

According to the present invention there is provided a receptacle or cradle for receiving a mobile telephone or other electrical or electronic device, comprising a base unit and a carriage moveable with respect to the base unit for receiving the mobile telephone or other device, wherein the base unit is provided with suitable electrical contact terminals for connection with corresponding electrical contact terminals of the mobile telephone or other device and wherein the carriage is restrained from movement in a first receiving position to receive the mobile telephone or other device and wherein the contact terminals of the unit are protected or shielded from damage by virtue of being excluded from making contact with the corresponding contact terminals of the telephone or other device until a predetermined alignment of the telephone or other device relative to the unit is achieved, the carriage having disengagement means associated therewith to allow travel of the carriage once the predetermined alignment of the telephone is achieved, whereupon the carriage is free to travel to a second in use position in which contact between the contact terminals of the telephone and unit is achieved, the carriage being once again restrained from movement in the second in use position to allow contact to be maintained and having a further disengagement means associated therewith to release the carriage from its second in use position in order to release the mobile telephone or other device from the unit.

Preferably, the carriage is also provided with locking means to restrain the mobile telephone or other device from being removed from the carriage whilst the carriage is in the second in use position. Such locking means are conveniently provided in the form of one or more flexible arms or fingers each of which is free to flex when the carriage is in the first receiving position so that it does not interfere with the insertion or removal of the telephone, but which is restrained from flexing in the second in use position to cooperate for example with a notch, slot or other suitable hole in the periphery of the telephone to restrain it from being removed in the second in use position. Such fingers or arms may be integral with the carriage or independent thereof.

With particular advantage the design of the unit and carriage may be accomplished without the need for any return or foldover portions forming any cup portion at all (as is the case with conventional designs) to contain the telephone. Thus it is preferred that the base unit comprise a U-shaped portion having a rear plate and side plates extending upwards therefrom, one end of the U-shaped portion being closed with an end comprising the contact points of the unit and other circuitry as required. The carriage is located and slideable within the U-shaped portion and preferably comprises a rear plate slideable on the rear plate of the base unit and a foot portion located at its lower end (ie adjacent the end of the base unit comprising the contact points) and perpendicular thereto.

Preferably the shielding or protection of the contact terminals of the unit is provided by the foot portion of the carriage itself when in the first receiving position, a slot arrangement in the foot of the carriage allowing access to the contact terminals when the carriage is in the second in use position.

It will be readily appreciated that the actual design of the hands free unit including its overall shape and dimensions will vary greatly according to the design of the telephone which it is intended it should accommodate. Furthermore, although a conventional form of telephone is described in relation to this invention it will be readily appreciated that individual designs differ to the extent that quite marked changes in the geometric relationship of the components herein described may be possible without departing from the scope of the invention. For example the terminal contacts of the telephone may be located at the rear rather than at the end or base of the telephone.

Retention of the carriage in the second in use position may be accomplished through any convenient hook or catch mechanism of known means. With advantage, the carriage may be provided with a spring arrangement to facilitate return of the carriage to its first receiving position, thereby assisting removal of the telephone, upon its release. Preferably, the carriage release is provided in the form of one or more buttons cooperating with each other, which are themselves either depressible or in the form of rocker plates rotatable about a pivot. In either case such buttons act against a suitable spring when depressed to release the catch which restrains the carriage. Because of constraints in finding suitable locations for the unit it is preferred that there be only a single release button which is conveniently mounted on an outer or exposed face of the unit to facilitate easy access thereto.

BRIEF DESCRIPTION OF THE DRAWINGS

An embodiment of the present invention will now be described with reference to the drawings in which.

BEST MODE OF CARRYING OUT THE INVENTION

Figure 1:
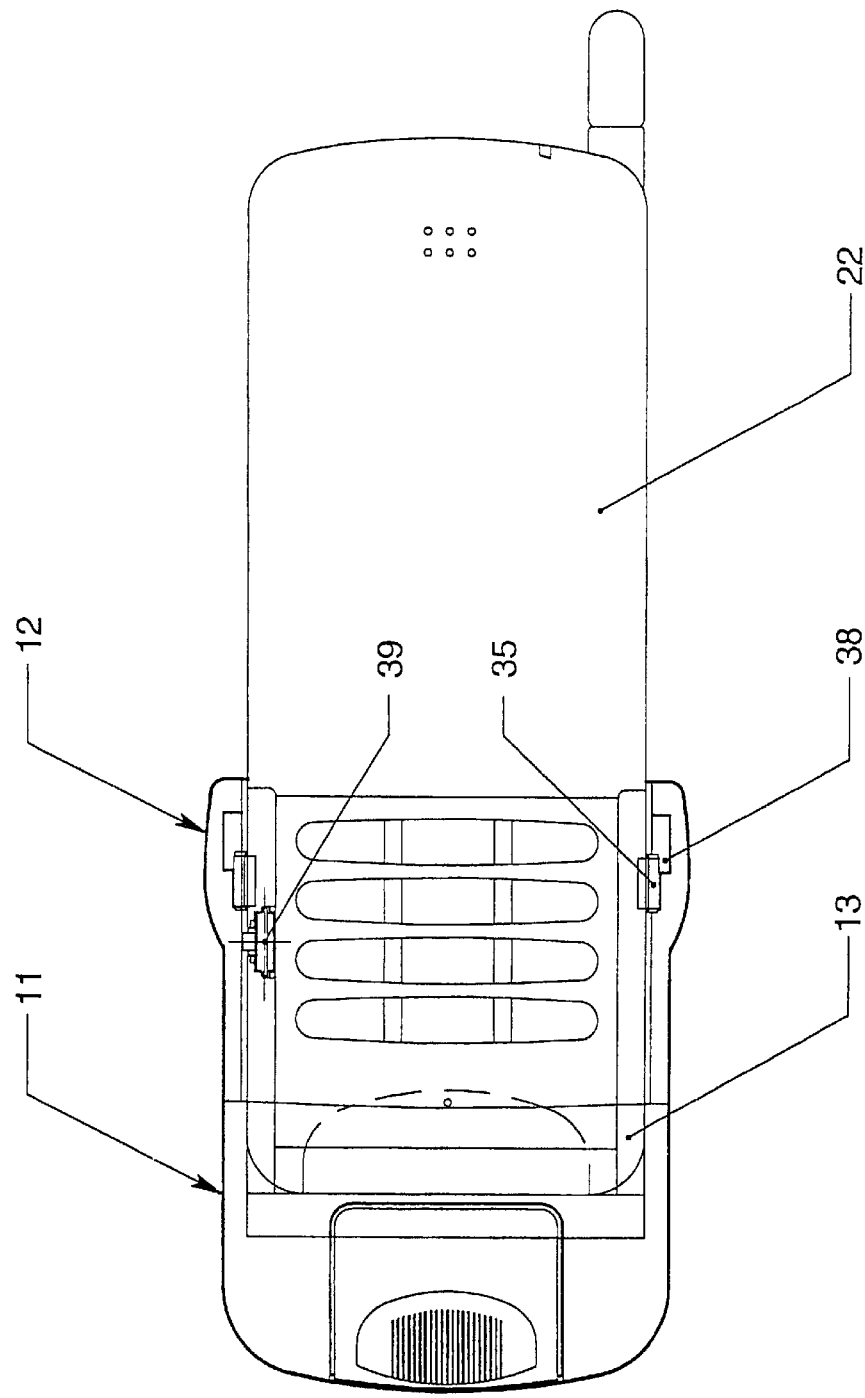
FIG. 1 is a plan view of an example of a hands free unit with telephone fitted according to the present invention.
Figure 2:
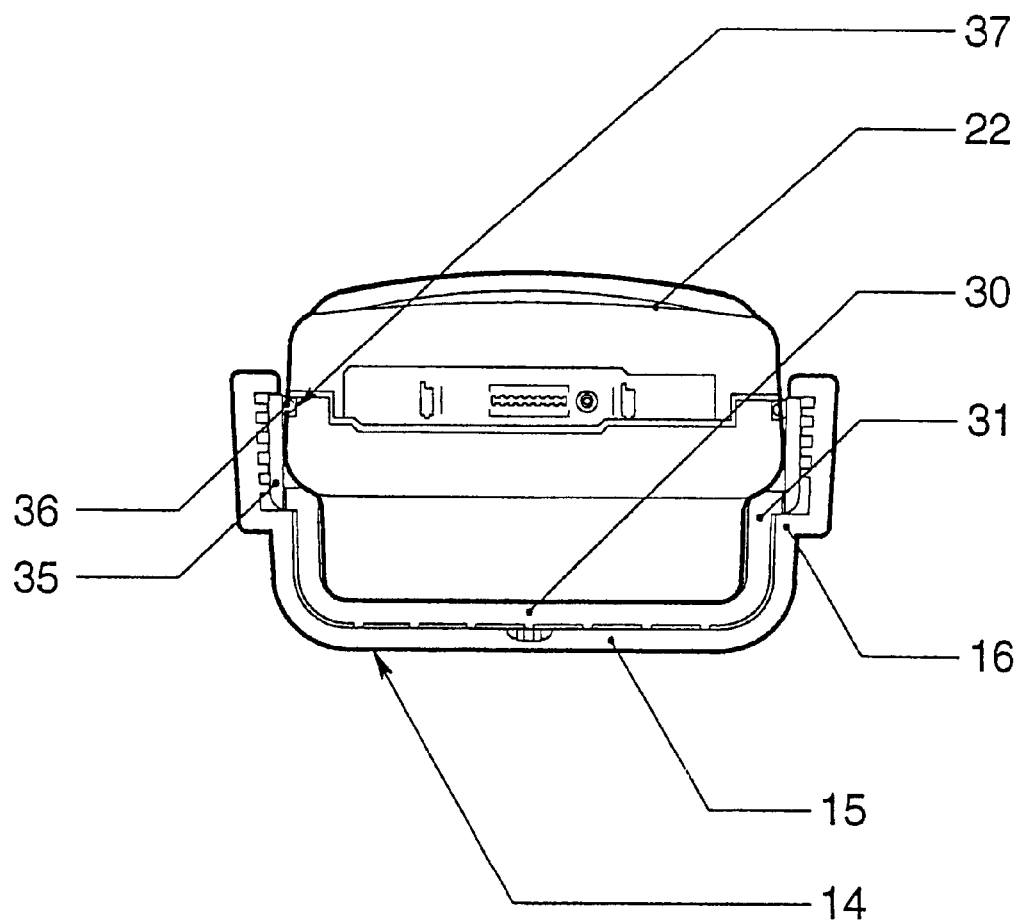
FIG. 2 is a cross sectional view of the embodiment of FIG. 1 again with telephone fitted.

Referring to the figures generally, a hands free cradle generally referenced 11, comprises a base unit 12, which contains a slideable carriage 13. The base unit consists of a generally U-shaped section 14 having a rear portion 15 and side walls 16 extending substantially perpendicular therefrom. At one end of the U-shaped portion 14 there is provided a housing 17, which includes an upper or cover portion 18. The housing 17 contains a printed circuit board and other electronic componentry generally referenced 19. Contact terminals 20 are provided in the circuit board 18 for connection with corresponding contact terminals 21 of a mobile telephone generally referenced 22 throughout the drawings. The housing 17 also contains a facility 23 for attaching cabling 24 therethrough to connect to various external components not illustrated, which include the vehicle power source and external aerial, speaker and microphone. The base unit 21 is attached by means of suitable fixing means, for example a screw 45, to a universal bracket arrangement 25 for fixing to a suitable location in a vehicle not illustrated.

The upper housing cover portion 18 contains a carriage release button 26 pivoted about points 27 and provided with a spring 28 to maintain it flush with upper housing 17. A spring 29 is also provided in housing 17 against which carriage 13 is mounted. Carriage 13 is of substantially U-shaped cross section having a rear portion 30 and side sections 31 extending substantially perpendicular thereto. The cross sectional shape of the carriage is largely determined by the cross sectional shape of the telephone with which it is intended to be used. Thus depending on the shape of the telephone, the cross sectional shape of the carriage may not always be a simple U-shape, being either more complex as necessary, or in several instances may even be a flat plate alone, requiring no side margins, for example where the telephone is has a simple cross section approximating a rectangle.

Figure 3:
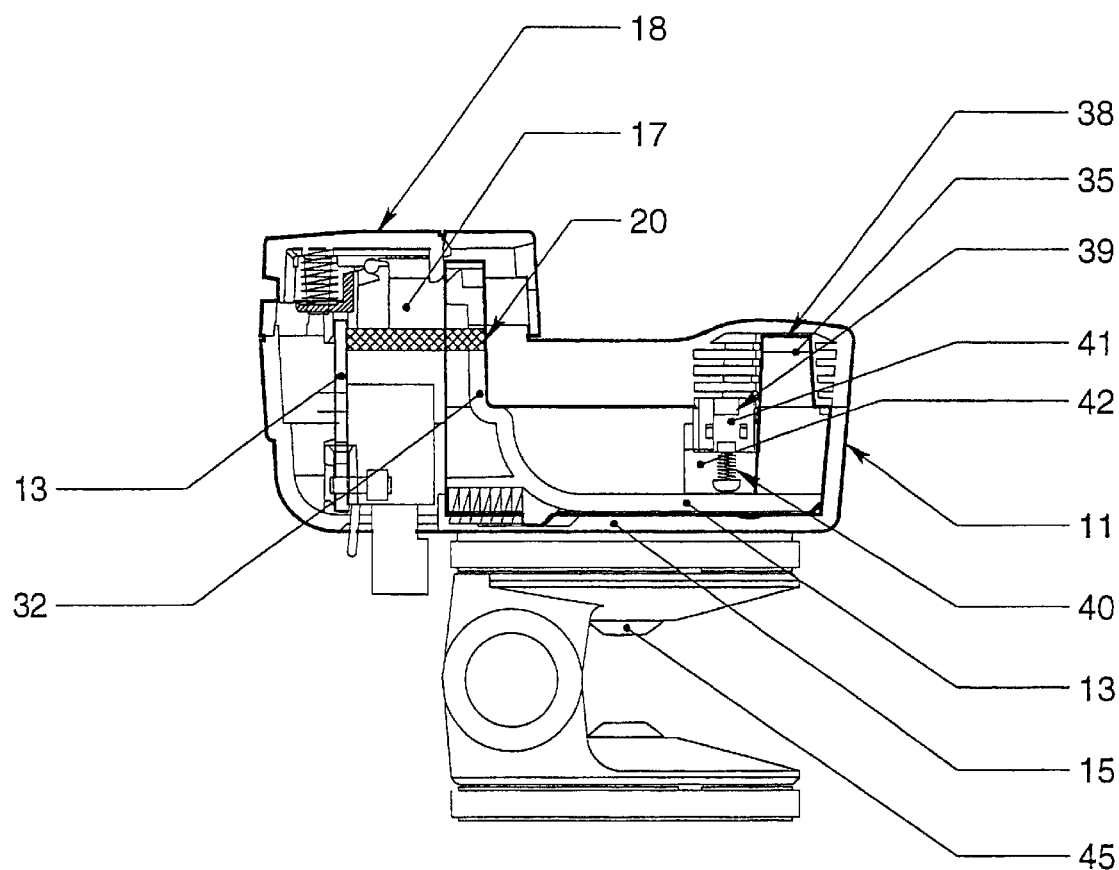
FIG. 3 is a cross sectional side elevation of the embodiment illustrated in FIGS. 1 and 2, showing the carriage in the carriage of the embodiment ready for insertion of a mobile telephone.
Figure 5:
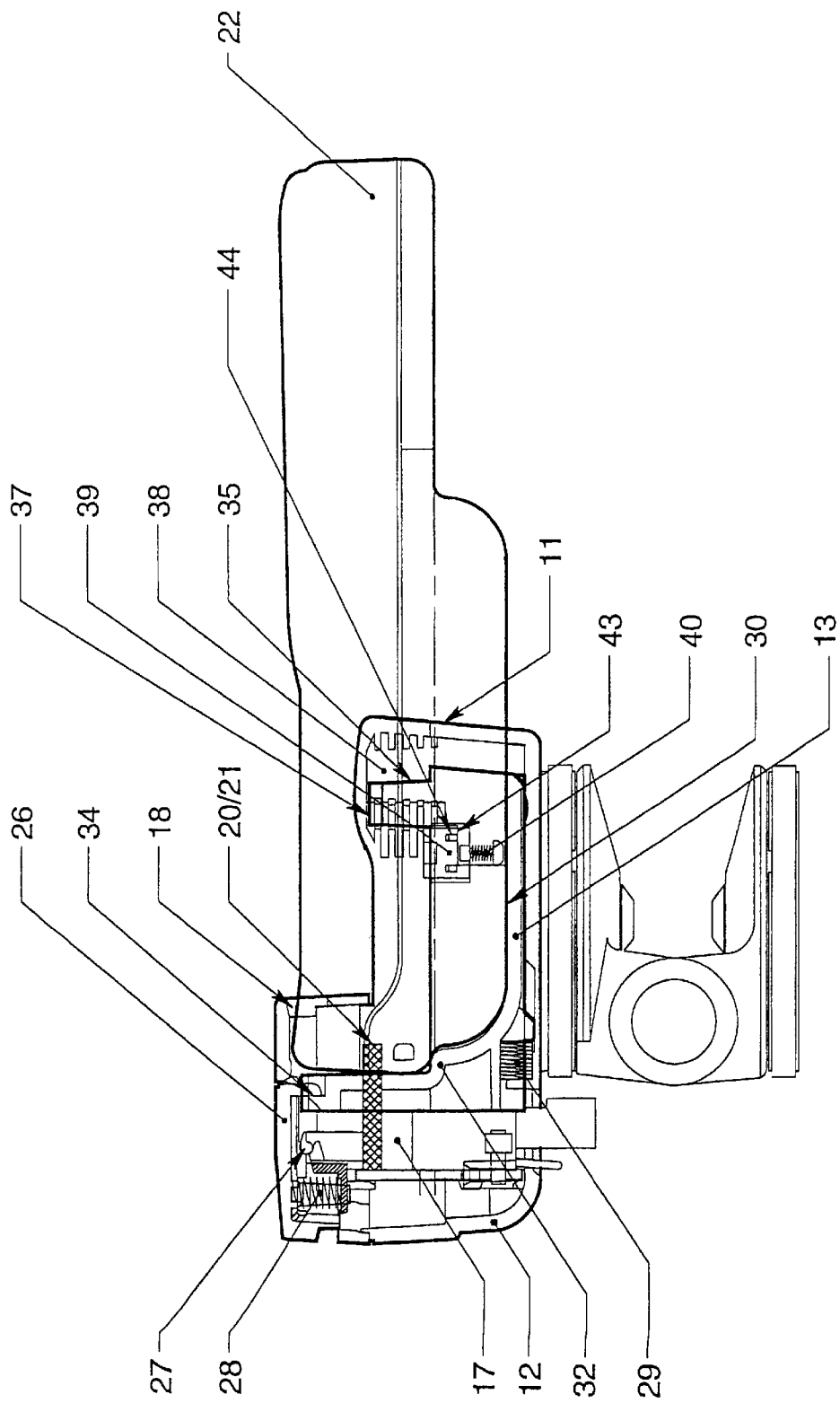
FIG. 5 is a further cross sectional side elevation of the embodiment as illustrated in previous figures showing the telephone fully inserted in the carriage.

A foot portion 32 is located at one end of the carriage 13 adjacent the housing 17 of the base 12. The foot portion 32 contains a slot 33 through which access to the contact terminals 20 is possible. The foot portion 32 also contains a suitable protrusion or hook arrangement 34 which is able to cooperate with release button 26 for restraining the carriage 13 in a second in use position (as shown in FIG. 5) when a mobile telephone 22 is located in the unit 11. Integral with the side portions 31 of the carriage 13 are a pair of flexible arms 35 extending therefrom and having hook elements or protrusions 36 at their extremities for engaging with corresponding slots or recesses 37 in the sides of the telephone 22. A corresponding recess 38 is provided adjacent and behind each arm 35 when the carriage 13 is in a first receiving position (as shown in FIG. 3), so that they can flex backwards to accommodate the telephone 22 without interference. However, when the carriage 13 travels to its second in use position (FIG. 5), the arms 35 are prevented from flexing and consequently remain engaged in the recesses 37 of the telephone 22.

A release catch or button 39 is provided in the side wall 31 of carriage 13 to allow release of the carriage 13 once the telephone 22 is laid fully in the carriage 13. The button 39 is spring loaded by means of spring 40. In the first receiving position as shown in FIG. 3, the carriage 13 is restrained from movement by virtue of button 39 which is confined in the upper portion 41 of an L-shaped slot 42. Upon depression of the spring 40, the button 39 is then able to pass along the lower portion 43 of the L-shaped slot 42 in which it resides, having been thus caused to clear shoulder 44, thereby also allowing the carriage 13 itself to move to its second in use position (FIG. 5). Thus, until the telephone 22 is resting against the back portion 30 of the carriage 13 and consequently disengaging button 39, carriage 13 will not be free to move. However, once the telephone 22 is fully seated against the back of the carriage 30, it will be consequently in alignment with the contact terminals 20 of the base. In this position, carriage 13 will then be free to travel to allow engagement of the corresponding contact terminals 20 and 21.

The various steps in inserting and releasing the telephone 22 are shown in sequence FIGS. 3 to 8. FIG. 3 shows carriage 13 in its first receiving position, in which arms 35 are able to flex as they are located in front of corresponding recesses 38. In this way the telephone 22 can be inserted into the carriage 13, without interference from the arms 35 which move into the slots 38. In this position, the foot portion 32 protects or shields the contact terminals 20 contained in housing 17 and the carriage 13 is restrained from movement by virtue of the position of carriage release button 39, which is in located in the upper portion 41 of L-shaped slot 42.

Figure 4:
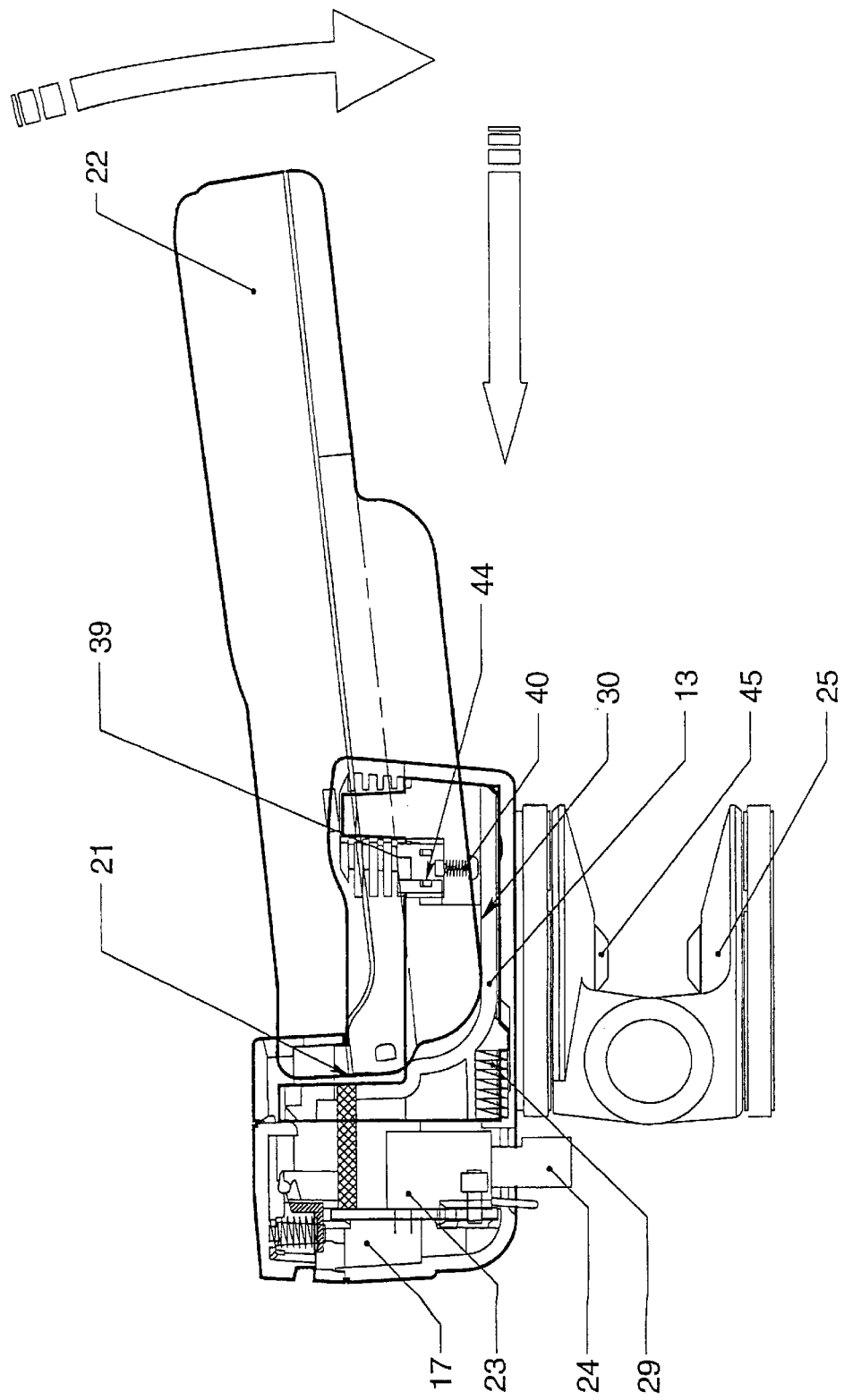
FIG. 4 is a cross sectional side elevation of the embodiment as illustrated in previous figures, showing insertion of the telephone into the carriage.

FIG. 4, depicts the insertion of the telephone 22 into the carriage 13, the direction of insertion being depicted by the arrows. As the telephone 22 makes contact with the back or rear portion 30 of the carriage 13, it will contact carriage release button 39 causing it to be depressed against spring 40. In doing so, it will be depressed sufficiently that it clears shoulder 44, thereby allowing it and the carriage 13 to slide against the action of spring 29 to its second in use position as shown in FIG. 5, thereby allowing contact and engagement between respective contact terminals 20 and 21 of the base unit 12 and telephone 22. Because the telephone 22 has already been aligned by virtue of these steps, damage to the contact terminals 20 and 21 is avoided.

Once the carriage 13 has travelled to its second in use position, as shown in FIG. 5, release button 26 is caused to be engaged with the hook portion 34 located on the end of foot portion 32 in order to lock the carriage 13 in position. In this position the flexing arms 35 are also restrained from movement, having moved away from the recesses 38 and consequently remain engaged in the corresponding recesses 37 of telephone 22. Thus the telephone 22 is restrained in carriage 13, which is itself locked in position.

Figure 6:
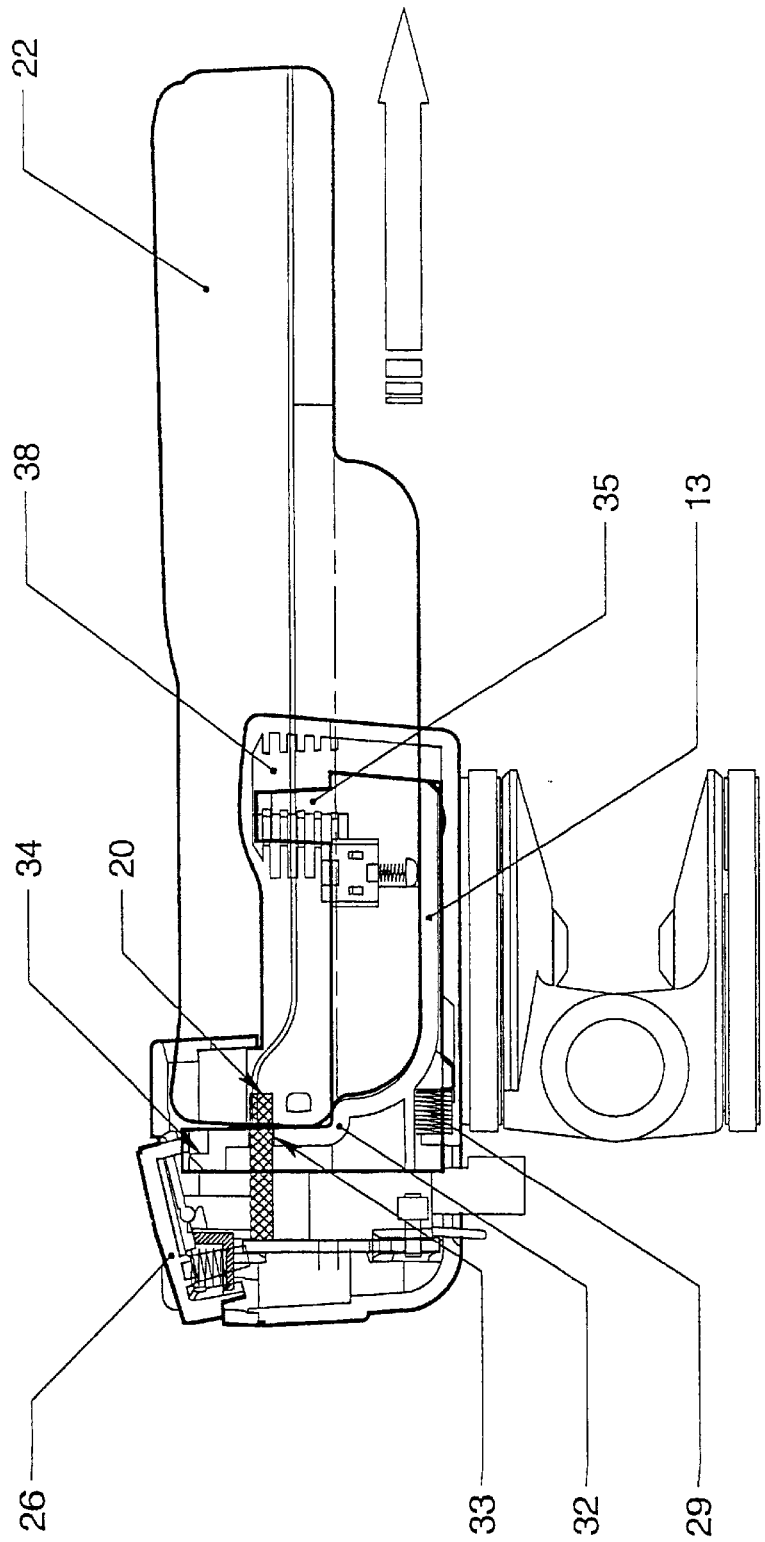
FIG. 6 is a further cross sectional side elevation of the embodiment as illustrated in previous figures showing depression of the carriage release button to allow withdrawal of the telephone.
Figure 7:
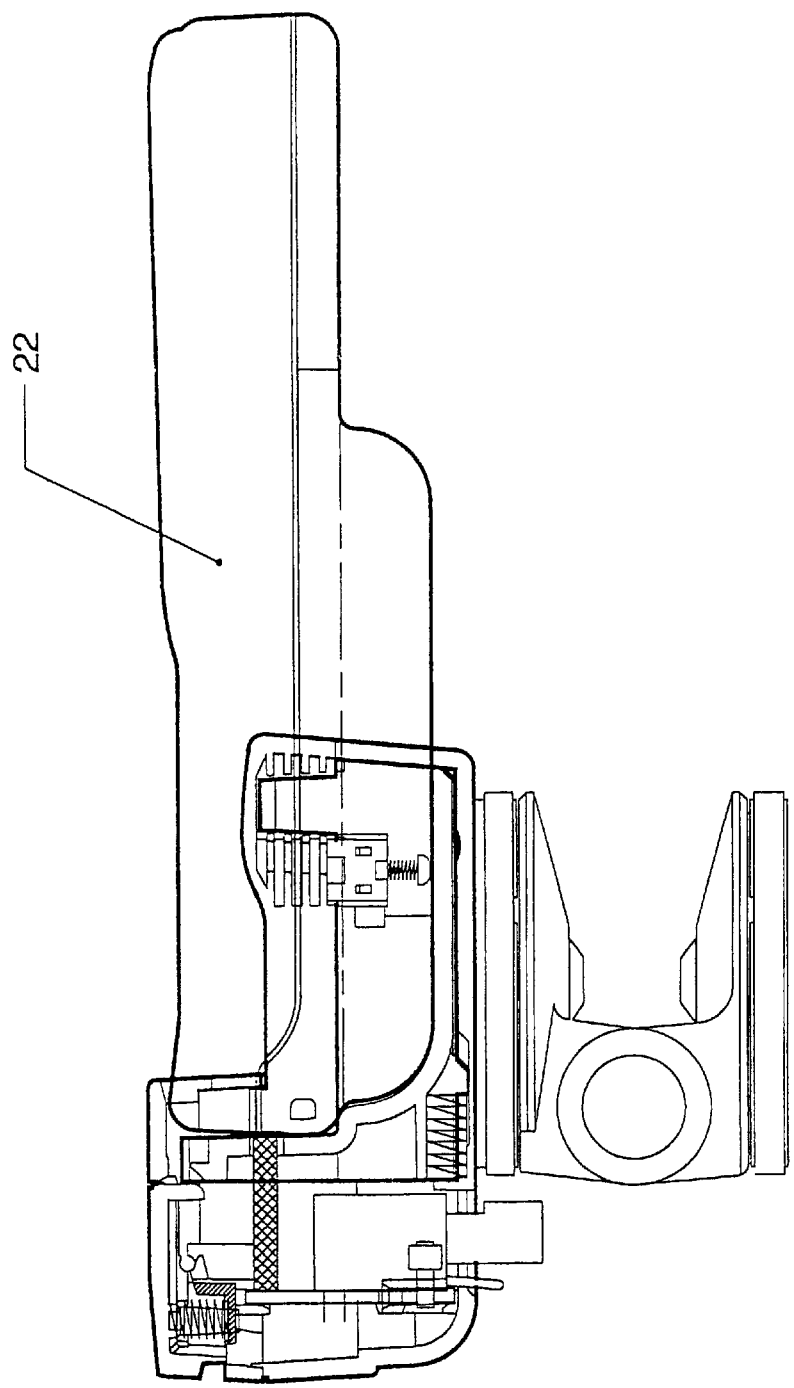
FIG. 7 is a further cross sectional side elevation of the embodiment as illustrated in previous figures showing that the carriage and telephone have moved forward under the action of spring force following its release in FIG. 6, the telephone being ready for removal from the carriage.
Figure 8:
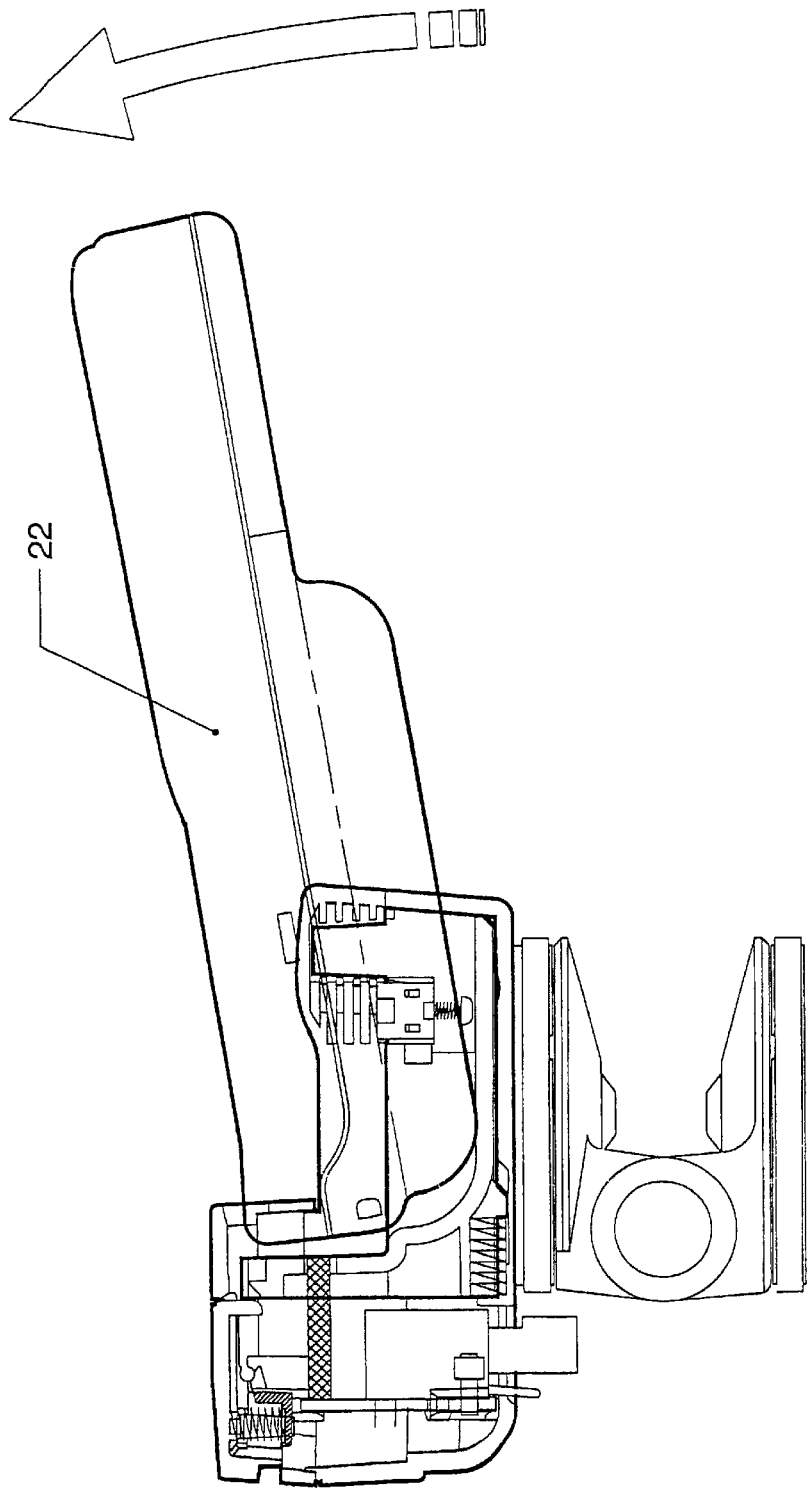
FIG. 8 is a further cross sectional side elevation of the embodiment of previous figures, showing removal of the telephone from the carriage of the cradle.

FIGS. 6 through 8 show the release of the carriage and telephone, which is essentially a reversal of the steps shown in FIGS. 3 through 5. Upon depression of carriage release button 26, it is disengaged from the hook 34 of the foot portion 32 of carriage 13, causing the carriage 13 to move under the action of spring 29 to its first or receiving position. In doing so, flexing arms 35 once again pass over recesses 38 allowing removal of the telephone from carriage 13 and consequently away from unit 11 altogether. Once again foot portion 32 of the carriage 13 moves away from the contact terminals 20 resulting in protection or shielding thereof.

The foregoing describes only one embodiment of the present invention, and modifications obvious to those skilled in the art can be made thereto without departing from the scope of the present invention.

We claim:

1. A receptacle or cradle for receiving a mobile telephone or other electrical or electronic device, comprising a base unit and a carriage moveable with respect to the base unit for receiving the mobile telephone or other device, wherein the base unit is provided with suitable electrical contact terminals for connection with corresponding electrical contact terminals of the mobile telephone or other device and wherein the carriage is restrained from movement in a first receiving position to receive the mobile telephone or other device and wherein the contact terminals of the unit are protected or shielded from damage by virtue of being excluded from making contact with the corresponding contact terminals of the telephone or other device until a predetermined alignment of the telephone or other device relative to the unit is achieved, the carriage having disengagement means associated therewith to allow travel of the carriage once the predetermined alignment of the telephone is achieved, whereupon the carriage is free to travel to a second in use position in which contact between the contact terminals of the telephone and unit is achieved, the carriage being once again restrained from movement in the second in use position to allow contact to be maintained and having a further disengagement means associated therewith to release the carriage from its second in use position in order to release the mobile telephone or other device from the unit.

2. A receptacle or cradle for receiving a mobile telephone or other electrical or electronic device according to claim 1, wherein the carriage is provided with locking means to restrain the mobile telephone or other device from being removed from the carriage whilst the carriage is in the second in use position.

3. A receptacle or cradle for receiving a mobile telephone or other electrical or electronic device according to claim 2, in which the locking means is provided in the form of one or more flexible arms or fingers each of which is free to flex when the carriage is in the first receiving position so that it does not interfere with the insertion or removal of the telephone, but which is restrained from flexing in the second in use position to cooperate with a notch, slot or other suitable hole in the periphery of the telephone to restrain it from being removed in the second in use position.

4. A receptacle or cradle for receiving a mobile telephone or other electrical or electronic device according to claim 3, in which the fingers or arms are either integral with the carriage or independent thereof.

5. A receptacle or cradle for receiving a mobile telephone or other electrical or electronic device according to claim 1, wherein the base unit comprises a U-shaped portion having a rear plate and side plates extending upwards therefrom, one end of the U-shaped portion being closed with an end comprising the contact points of the unit and other circuitry as required.

6. A receptacle or cradle for receiving a mobile telephone or other electrical or electronic device according to claim 5, wherein the carriage is located and slideable within the U-shaped portion.

7. A receptacle or cradle for receiving a mobile telephone or other electrical or electronic device according to claim 6, wherein the carriage comprises a rear plate slideable on the rear plate of the base unit and a foot portion located at its lower end adjacent the end of the base unit comprising the contact points, the foot portion being perpendicular to the rear plate.

8. A receptacle or cradle for receiving a mobile telephone or other electrical or electronic device according to claim 7, wherein the shielding or protection of the contact terminals of the unit is provided by the foot portion of the carriage when in the first receiving position, a slot arrangement in the foot of the carriage allowing access to the contact terminals when the carriage is in the second in use position.

9. A receptacle or cradle for receiving a mobile telephone or other electrical or electronic device according to claim 1, in which the retention of the carriage in the second in use position is accomplished by means of a hook or catch mechanism.

10. A receptacle or cradle for receiving a mobile telephone or other electrical or electronic device according to claim 1, wherein the carriage is provided with a spring arrangement to facilitate return of the carriage to its first receiving position, thereby assisting removal of the telephone, upon its release.

11. A receptacle or cradle for receiving a mobile telephone or other electrical or electronic device according to claim 1, in which the disengagement means to release the carriage from its second in use position is provided in the form of one or more buttons cooperating with each other, which are themselves either depressible or in the form of rocker plates rotatable about a pivot, wherein such buttons act against a suitable spring, so that when depressed cause release of the catch which restrains the carriage.

12. A receptacle or cradle for receiving a mobile telephone or other electrical or electronic device according to claim 11, in which there is provided a single release button only which is mounted on an outer or exposed face of the unit to facilitate easy access thereto.

* * * * *